(12) United States Patent
Junk

(10) Patent No.: US 9,013,412 B2
(45) Date of Patent: Apr. 21, 2015

(54) USER INTERFACE FOR A PORTABLE COMMUNICATOR FOR USE IN A PROCESS CONTROL ENVIRONMENT

(75) Inventor: Kenneth W. Junk, Marshalltown, IA (US)

(73) Assignee: Fisher Controls International LLC, Marshalltown, IA (US)

(*) Notice: Subject to any disclaimer, the term of this patent is extended or adjusted under 35 U.S.C. 154(b) by 640 days.

(21) Appl. No.: 12/631,261

(22) Filed: Dec. 4, 2009

(65) Prior Publication Data
US 2010/0141596 A1 Jun. 10, 2010

Related U.S. Application Data

(60) Provisional application No. 61/120,284, filed on Dec. 5, 2008.

(51) Int. Cl.
G06F 3/041 (2006.01)
G05B 19/042 (2006.01)
G06F 3/0488 (2013.01)

(52) U.S. Cl.
CPC .......... G05B 19/042 (2013.01); G06F 3/04886 (2013.01); G05B 2219/23377 (2013.01)

(58) Field of Classification Search
None
See application file for complete search history.

(56) References Cited

U.S. PATENT DOCUMENTS

| | | | |
|---|---|---|---|
| 6,466,893 B1 | 10/2002 | Latwesen et al. | |
| 7,640,007 B2 | 12/2009 | Chen et al. | |
| 2004/0243648 A1* | 12/2004 | Hidaka et al. | 707/200 |
| 2005/0164684 A1 | 7/2005 | Chen et al. | |
| 2008/0075012 A1 | 3/2008 | Zielinski et al. | |
| 2008/0115060 A1 | 5/2008 | Mosko | |
| 2008/0122796 A1* | 5/2008 | Jobs et al. | 345/173 |
| 2009/0113328 A1* | 4/2009 | Leonard | 715/765 |
| 2010/0141596 A1* | 6/2010 | Junk | 345/173 |

FOREIGN PATENT DOCUMENTS

| | | |
|---|---|---|
| CN | 1804744 A | 7/2006 |
| WO | WO-96/03687 A1 | 2/1996 |
| WO | WO-2008/030976 A2 | 3/2008 |

OTHER PUBLICATIONS

International Search Report for Application No. PCT/US2009/066622, dated Jul. 23, 2010.
Written Opinion of the International Searching Authority, dated Jul. 23, 2010.

(Continued)

Primary Examiner — Joseph Haley
Assistant Examiner — Ifedayo Iluyomade
(74) Attorney, Agent, or Firm — Marshall, Gerstein & Borun LLP

(57) ABSTRACT

A portable communicator for use in a process control system. The portable communicator includes a touchscreen configured to receive input from a user. The touchscreen may include a user interface that separate the scrolling functionality from the selection functionality. In one embodiment, the user interface includes a first portion and a second portion that is separate from the first portion. The first portion of the user interface includes multiple input fields associated with a multiple parameters of a field device. The first portion enables a user to scroll through the multiple input fields (e.g., via a grab-and-drag mechanism), and the second portion enables the user to select a value for at least one of the multiple input fields in the first portion.

21 Claims, 5 Drawing Sheets

(56) References Cited

OTHER PUBLICATIONS

International Preliminary Report on Patentability, dated Jun. 16, 2011.
China State Intellectual Property Office first office action for Chinese Application No. 200980148854.1, dated Mar. 5, 2013.
China State Intellectual Property Office second office action for Chinese Application No. 200980148854.1, dated Nov. 21, 2013.
Russian Patent and Trademark Agency Notification of the Patentability Examination Results in Russian Application No. 2011124745/08(036580), dated Dec. 26, 2013.
Examination Report for Gulf Cooperation Council Application No. GCC/P/2009/14845, dated Aug. 5, 2014.

* cited by examiner

USER INTERFACE FOR A PORTABLE COMMUNICATOR FOR USE IN A PROCESS CONTROL ENVIRONMENT

FIELD OF DISCLOSURE

The present disclosure relates generally to process control networks and, more particularly, to operating field devices via a portable communicator.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the HART®. protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant.

Various techniques have been developed for analyzing the performance and detecting problems with various field devices. In one technique, for example, a "signature" of a valve is captured when the valve is first commissioned. For instance, the system may stroke the valve from 0 to 100% and record the amount of air pressure required to move the valve through its full cycle. This "signature" is then used to monitor the actual air pressure against the signature air pressure and alert a maintenance technician when the deviation is too great.

Using other known techniques (e.g., disclosed in the U.S. Pat. No. 6,466,893, entitled "Statistical Determination of Estimates of Process Control Loop Parameters," hereby expressly incorporated by reference herein), it is possible to determine estimates of one or more process loop parameters, such as friction, dead band, dead time, oscillation, shaft windup or backlash of a process control device. In particular, it is possible to collect signal data related to an output parameter and to an input parameter, store the signal data as a series of discrete points, eliminating some of the points in the series according to a predefined algorithm, and performing a statistical analysis of the reduced series to obtain an average value of one or more process control parameters. This allows estimating average actuator friction for a sliding stem valve, for example.

In some cases, it may be difficult to use the process control system to analyze performance and detect problems associated with field devices. For example, an operator at the control room and a maintenance person in the field may be required to coordinate efforts to capture the signature of a valve. To stroke the valve using the process control system, the maintenance person may need to request a set point change from the operator while the operator is busy monitoring and addressing live processes. As a result, the operator may not be able to perform the desired on time. Furthermore, in some instances, it may be desirable to evaluate a field device when the field device is disconnected from the process control system (e.g., when the device is in a maintenance shop, or before the device is installed on the line). In these and other similar cases, it may be beneficial to analyze the performance of field devices locally (e.g., in the field, in the maintenance shop, and so on).

Devices may be analyzed locally in the field using handheld field maintenance tools. Since at least some process installations may involve highly volatile, or even explosive, environments, it is often beneficial, or even required, for the handheld field maintenance tools used with such field devices to comply with intrinsic safety requirements. These requirements help ensure that compliant electrical devices will not generate a source of ignition even under fault conditions. One example of Intrinsic Safety requirements is set forth in: APPROVAL STANDARD INTRINSICALLY SAFE APPARATUS AND ASSOCIATED APPARATUS FOR USE IN CLASS I, II and III, DIVISION NUMBER 1 HAZARDOUS (CLASSIFIED) LOCATIONS, CLASS NUMBER 3610, promulgated by Factory Mutual Research January, 2007. An example handheld field maintenance tool that complies with intrinsic safety requirements is the Model 375 Field Communicator (discussed in U.S. Published Application No. 2008/0075012 entitled "Handheld Field Maintenance Bus Monitor," hereby expressly incorporated by reference herein and commonly assigned) sold by Emerson Process Management.

While handheld field maintenance tools are very helpful in monitoring field devices locally, they often include user interfaces that present some challenges, especially in the field. For example, traditional handheld field maintenance tools may require single-line entries, which result in substantial and numerous abbreviations and clipped text. Traditional handheld field maintenance tools may further require a stylus, or a soft-input panel (SIP), which may take time to replace if lost in the field, rendering the handheld field maintenance tool largely inoperable because handheld devices that require a stylus typically employ resistive touchscreens. Resistive touchscreens tend to have stiff outer membranes and are prone to skipping and jitter when touched with a finger. Skipping occurs when a stylus, or another object (e.g., a finger), slides across the touchscreen and intermittently loses contact with the screen. Timing algorithms can be used to minimize skipping, but such algorithms introduce time delays that may inhibit the performance of a touchscreen. Jitter occurs when a an object (especially a relatively large, or rounded or blunted object, like a finger) is stationary on the touchscreen. The stationary object may appear to a resistive screen as a collection of objects, and the touchscreen may be unable to resolve a single point of contact). Dead band algorithms can be used to minimize jitter, but such algorithms may introduce additional display errors and time delays. Resistive screens are further generally poorly equipped to differentiate between a clicking action (e.g., pressing on the screen with a stylus) and a scrolling action (e.g., moving the stylus).

On the other hand, handhelds that do not require a stylus or an SIP, and are touch sensitive, typically employ capacitive screens and respond well only to conductive objects (e.g., a bare finger). They do not respond well to passive objects and are therefore difficult to operate, when wearing gloves, for example. Finally, traditional handheld field maintenance tools often include sophisticated features and interfaces that, while helpful, may be less institutive for users.

SUMMARY

In general, a portable communicator is provided for use in a process control environment, for example, to diagnose and/or calibrate field devices in a process control plant. The portable communicator includes a touchscreen configured to receive input from a user. The touchscreen may include a user interface configured to divide the display area of the touchscreen into several portions to include at least one drag-and-drop portion and at lest one selection portion.

In some embodiments, the drag-and-drop portion 302 may include a list of input fields, where each input field includes the name and a value associated with the input. The name of the input field and the value associated with that input field may be displayed in a single entry on the touchscreen. Names and values associated with a given input field may be displayed in an entry in an offset form to minimize text clipping, abbreviations, and horizontal scrolling.

In some embodiments, the selection portion includes a list of selection buttons that correspond to the input fields. The selection buttons may be configured to allow the user to select a value for the associated input field. In some embodiments, the user interface may be configured to bock a user from selecting values for given input fields. A user may be alerted about a blocked input field via a visual indicator placed next to the input button of associated blocked input field.

In some embodiments, a user may scroll across the input fields and corresponding selection buttons by pressing down, e.g., with a finger, anywhere on the drag-and-drop portion of the user interface and moving the finger across the touchscreen. A user may also use a D-pad to scroll across the input fields and the corresponding input buttons. In some embodiments, animation ("kinetic") devices may be added to the scrolling display by passing mouse movements to through a discrete transfer function.

In some embodiments, a user may select the value associated with a input field by pressing down, e.g., with a finger, on the associated selection button and selecting a desired value from a list of values. When a user presses down on a given selection button, the user may be presented with a menu of possible values for the associated input field, and the user may select a desired value for the input field by pressing down on that value in the menu.

In some embodiments, the user interface is configured to effectively separate the scrolling operations from the selecting operations. As a result, adverse effects of skipping and jitter may be substantially minimized. More specifically, if skipping and/or jitter occurs during a scrolling operation, the scrolling and/or jitter may have little of no effect on preceding and/or subsequent selecting operations. Consequently, inadvertent selection of values for input fields may be prevented. Likewise, inadvertent selection scrolling may be prevented during the selection of values for input fields.

In some embodiments, the portable communicator may include quick navigation buttons to allow users to navigate the user interface of the portable communicator.

In some embodiments, the portable communicator is configured to communicate with the field device to configure and/or analyze performance of a field device in an efficient mariner. The portable communicator may communicate with the field device via a wire and/or wirelessly. The portable communicator may be a Bluetooth-enabled smartphone, a PDA, a pocket PC, or any Bluetooth-enabled generic mobile communication device. The portable communicator may communicate with the field device via a wireless communication unit coupled to the field device. The wireless communication unit may be external or internal to the field device. In some embodiments, the wireless communication unit may be coupled to the field device via auxiliary terminals of the field device. In some embodiments, the wireless communication unit may be coupled to the field device via a control loop. In some embodiments, the wireless communication unit may be coupled directly to a component, or a subcomponent, of the field device.

The portable communicator may communicate with the wireless communication unit via the Bluetooth standard. The wireless communication unit may include a protocol interface to convert Bluetooth signals to signals compatible with the field device and vice versa. In some embodiments, the wireless communication unit may include a protocol interface to convert Bluetooth signals to HART® signals and vice versa.

In another aspect, a software system provides an intuitive interface for interacting with a field device operating in a process control environment. In at least some of the embodiments, the software system can operate on a variety of hardware platforms (e.g., a cellular phone or a smartphone, a PDA, etc.) To this end, the software system may be compatible with a virtual machine such as Java Virtual Machine (JVM), for example. Additionally or alternatively, the software system can operate on a specialized portable communicator such as Model 375 Field Communicator, for example. In some embodiments, the software system includes some or all of a communication interface module for exchanging data with one or several field devices; a test logic module for sending commands to a field device, analyzing the corresponding responses, trending test results, converting device data to another format, etc.; a control module for formatting and sending commands to a field device via the communication interface module; and a user interface module for displaying options to a user on a screen, for example, receiving commands from a keypad, a touch-screen, an audio module, etc.

Details of particular embodiments of the portable communicator are set forth in the accompanying drawings and in the description below. Further features, aspects, and advantages of the portable communicator will become apparent from the description and the drawings.

DETAILED DESCRIPTION OF THE DRAWINGS

FIG. 1. illustrates an example process control system environment in which a portable communicator may be used;

Figure 1:
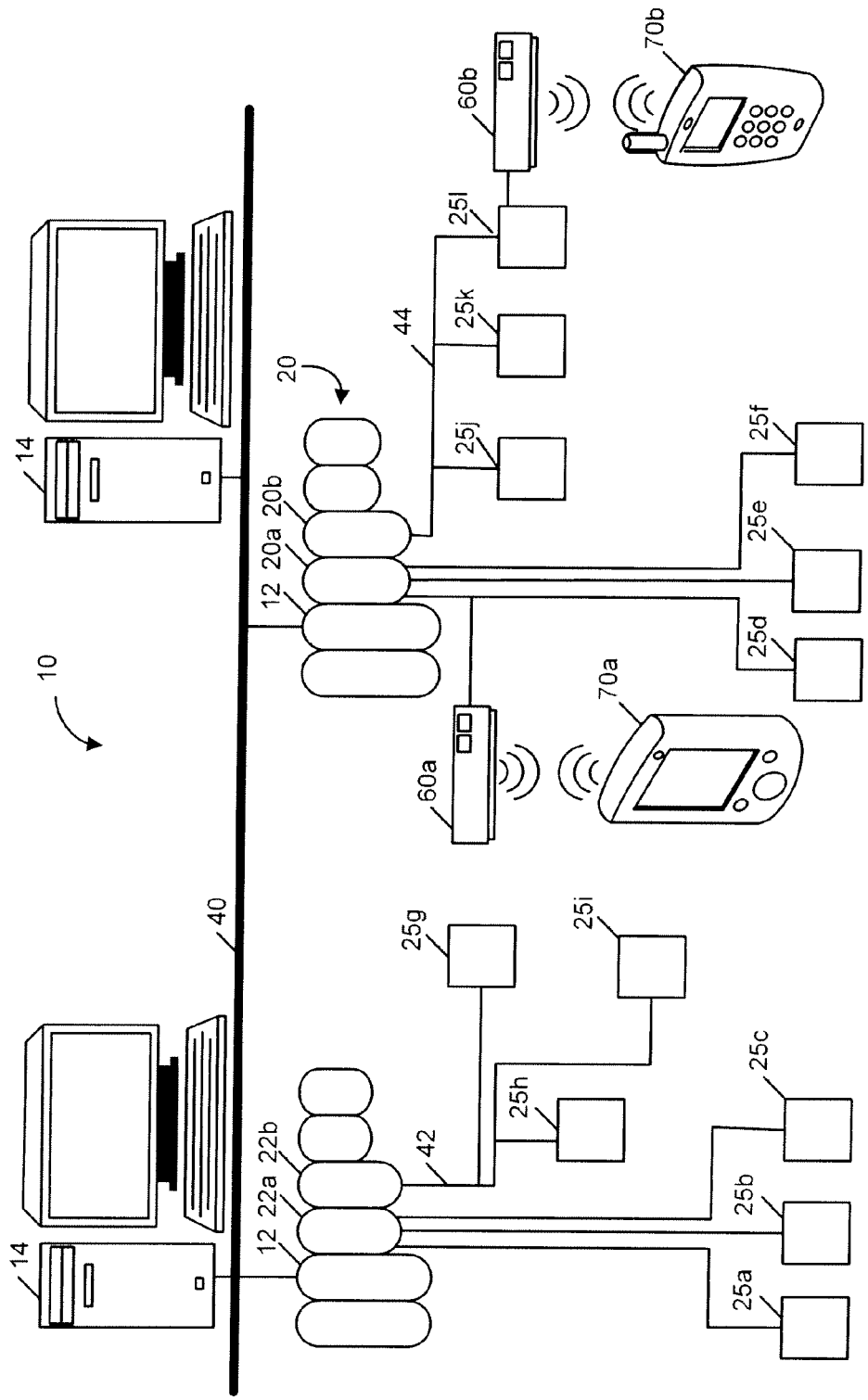
Figure 2:
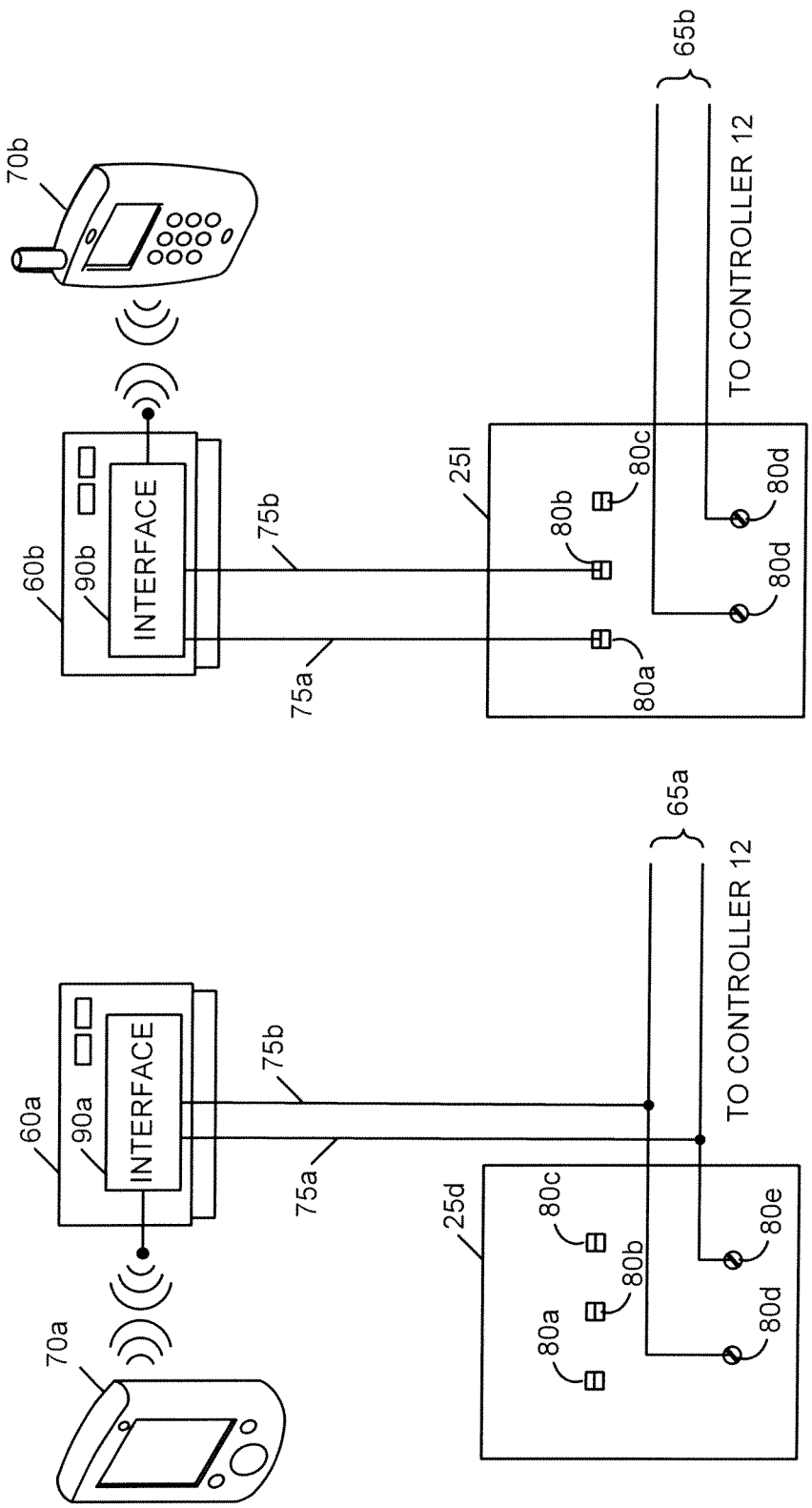
FIG. 2A illustrates one example coupling between a wireless communication unit and a field device.
FIG. 2B illustrates another example coupling between a wireless communication unit and a field device.
Figure 3:
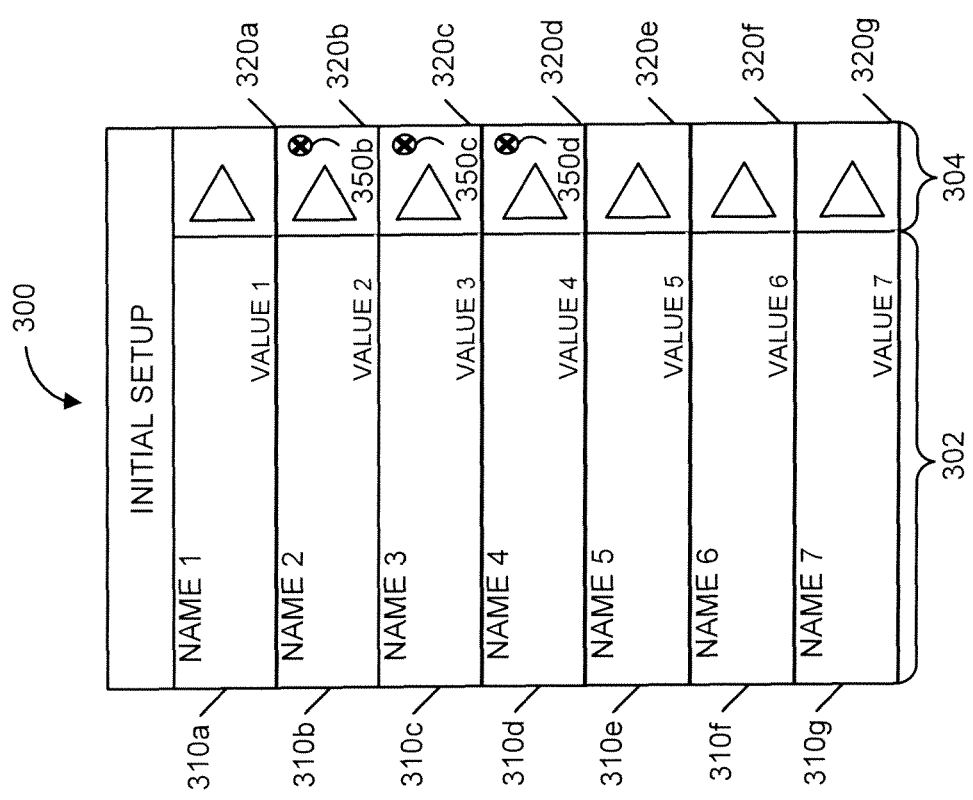
FIG. 3 illustrates an example user interface on a portable communicator.
Figure 4:
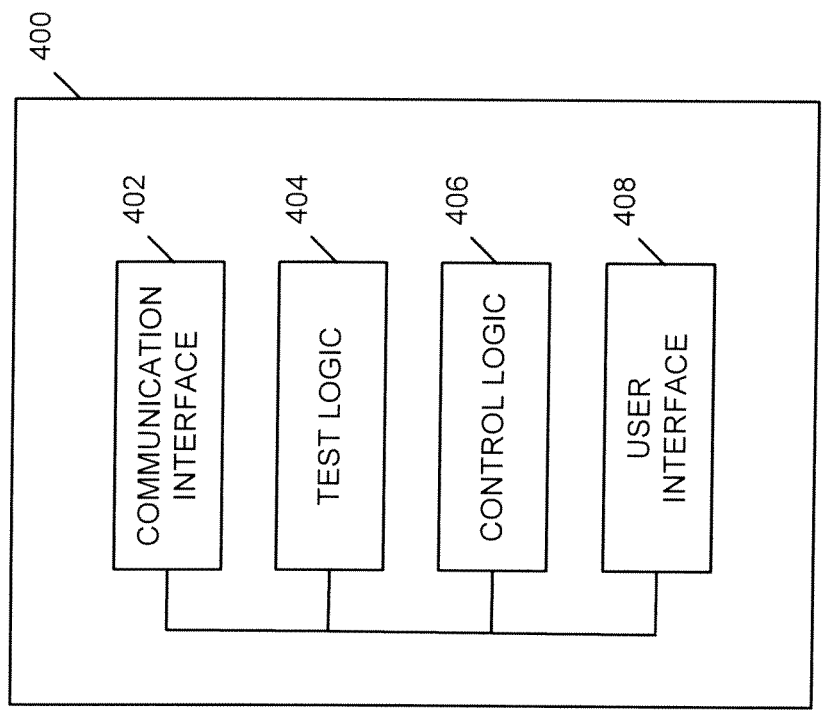
Figure 5:
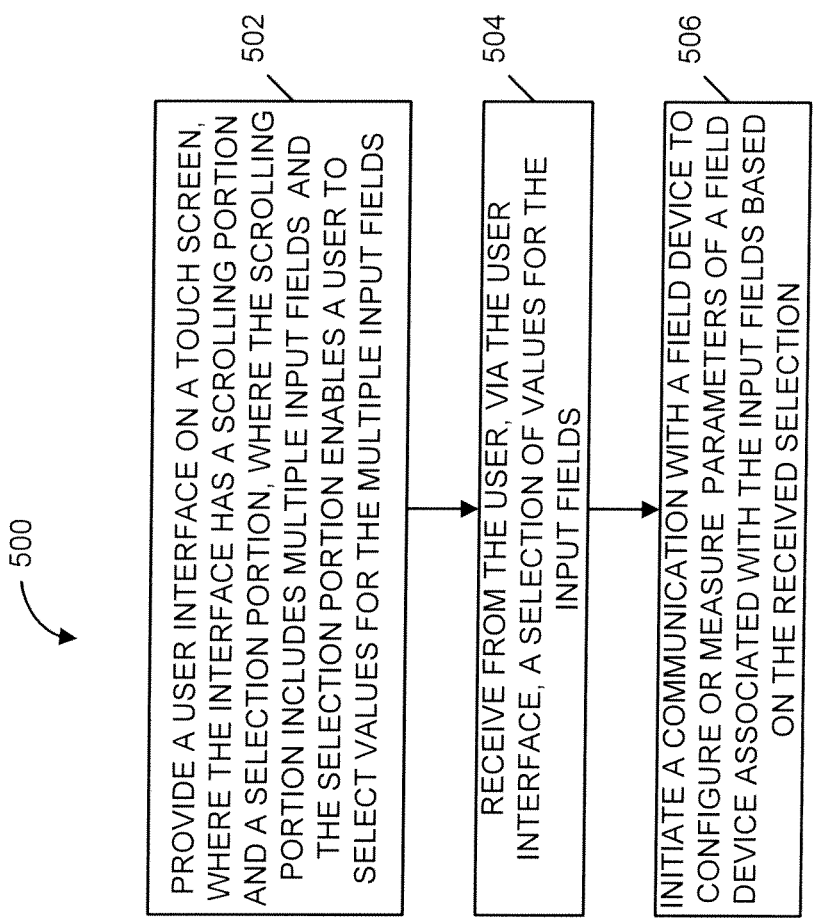

FIG. 4 schematically illustrates several modules of a software system that may execute on a portable communicator of FIGS. 1-3; and FIG. 5 illustrates an example method for interacting with a field device using the portable communicator of FIGS. 1-3.

DETAILED DESCRIPTION

FIG. 1 illustrates an example process control system 10. The process control system 10 includes one or more process controllers 12 connected to one or more host workstations or computers 14 (which may be any type of personal computer or workstation and connected to banks of input/output (I/O) devices 20, 22 each of which, in turn, is connected to one or more field devices 25 (hereinafter, elements designated with reference numbers in the format Na, Nb, . . . Nz are collectively referred to using reference number N). The controllers 12, which may be, by way of example only, DeltaV™ controllers sold by Fisher-Rosemount Systems, Inc., are communicatively connected to the host computers 14 via, for example, an Ethernet connection 40 or other communication link. Likewise, the controllers 12 are communicatively connected to the field devices 25 using any desired hardware and software associated with, for example, standard 4-20 ma devices and/or any smart communication protocol such as the Fieldbus or HART protocols. As is generally known, the controllers 12 implement or oversee process control routines stored therein or otherwise associated therewith and communicate with the devices 25-36 to control a process in any desired manner.

The field devices 25 may be any types of devices, such as sensors, valves, transmitters, positioners, etc. while the I/O cards within the banks 20 and 22 may be any types of I/O devices conforming to any desired communication or controller protocol such as HART, Fieldbus, Profibus, etc. In the embodiment illustrated in FIG. 1, the field devices 25a-25c are standard 4-20 ma devices that communicate over analog lines to the I/O card 22a. The field devices 25d-25f are illustrated as HART devices connected to a HART compatible I/O card 20A. Similarly, the field devices 25j-25l are smart devices, such as Fieldbus field devices, that communicate over digital bus 42 or 44 to the I/O cards 20B or 22B using, for example, Fieldbus protocol communications. Of course, the field devices 25 and the banks of I/O cards 20 and 22 could conform to any other desired standard(s) or protocols besides the 4-20 ma, HART or Fieldbus protocols, including any standards or protocols developed in the future.

Each of the controllers 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course hybrid and other types of function blocks exist. Groups of these function blocks are called modules. Function blocks and modules may be stored in and executed by the controller 12, which is typically the case when these function blocks are used for, or are associated with standard 4-20 ma devices and some types of smartfield devices, or may be stored in and implemented by the field devices themselves, which may be the case with Fieldbus devices. While the description of the control system is provided herein using function block control strategy, the control strategy could also be implemented or designed using other conventions, such as ladder logic, sequential flow charts, etc. and using any desired proprietary or non-proprietary programming language.

The process control system 10 includes one or more wireless communication units 60 and 60 that may provide wireless operations to field devices 25. Wireless communication units 60 may include local power storage devices, such as replaceable batteries. Wireless communication units 60 may comply with intrinsic safety requirements. Although FIG. 1 illustrates wireless communication units 60 as standalone external devices, the wireless communication units 60 may also be internal units, e.g., embedded into devices 25.

In some embodiments, wireless communication units 60 may be equipped with a wireless communication protocols, such as Bluetooth. As a result, wireless communication units 60 can allow field devices 25 to communicate wirelessly with portable communicators 70 (e.g., smartphones, PDAs, pocket PCs, and so on) that have Bluetooth capabilities. An example wireless communication unit 60 is the VIATOR® Bluetooth Interface Model 010041 for use with HART® field devices sold by MACTek® Corporation.

Wireless communication units 60 may be coupled to field devices 25, such as a digital valve controller (DVC) in a number of ways, and FIGS. 2A-2B illustrate a few examples of coupling. Referring FIG. 2A, in some embodiments a wireless communication unit 60a may be coupled to a field device 25d via a process instrumentation control loop. The wireless communication unit 60a may be coupled to the control loop 65 with leads 75, mini-grabber clips, and so on. Referring to FIG. 2B, a wireless communication unit 60b may also be coupled to a field device 25l via auxiliary terminals 80 of the field device (also using leads, mini-grabber clips, and so on). In such and similar configurations, a wireless communication unit 60 may include a protocol interface 90 configured to convert signals compatible with portable communicators 70 to signals compatible with field devices 25 and vice versa. For example, if the portable communicator 70 is a Bluetooth-enabled PDA, and a field device 25 is a HART-compatible device, the protocol interface 90 may be configured to convert Bluetooth signals to HART signals and vice versa.

Alternatively, wireless communication units 60 may be coupled directly to particular components, or subcomponents, of field devices. For example, a wireless communication unit 60 may be coupled to a microprocessor of the positioner included in a digital valve controller (DVC). In such alternative configuration (not shown), a protocol interface such as the Bluetooth-HART interface discussed above in reference to FIGS. 2A-2B may not be required, and a portable communicator 70 may communicate directly with field devices 25 using, for example, the Bluetooth standard.

Portable communicators 70 described above may be used to configure field devices 25 and to generally analyze the performance of and detect problems with the field devices 25 (e.g., in the field, in the maintenance shop, and so on). For example, a portable communicator 70 may be used to perform a valve stroke test, to capture the signature of the valve as described above, or to compare the actual performance of the valve against a signature. Likewise, a portable communicator 70 may be used to generally estimate loop parameters, such as friction, dead band, dead time, oscillation, shaft windup or backlash of a field device.

In some embodiments, a portable communicator 70 includes a touchscreen, and the portable communicator 70 is configured to receive user input via the touchscreen. More specifically, the portable communicator 70 is configured to detect and respond to the presence and location of an input object that is in physical contact with the touchscreen. The touchscreen included in the portable communicator is not limited to a particular known touchscreen hardware technology. For example, the touchscreen may be a resistive screen, a capacitive screen, a combination thereof, and so on. Moreover, the touchscreen is configured detect and respond to the presence and location of any input object, including a capacitive object, such as a bare finger, and passive object, such as a stylus or a clothed finger e.g., in a glove), and so on.

FIG. 3 illustrate an example user interface 300 of a portable communicator 70 that is configured to receive user input via a touchscreen. For example, the user interface 300 may be configured to receive user input regarding control parameters of a field device 25 (e.g., a valve). However, it will be appreciated that the user interface 300 is not limited to any particular type of data. The user interface 300 may be configured, for example, to receive user input regarding communication parameters associated with a wireless communication device, test parameters associated with a maintenance procedures, and so on.

In some embodiments, the user interface 300 is configured no that the display area of the touchscreen is divided (e.g., vertically) into several portions and includes at least one drag-and-drop portion 302 and at least one selection portion 304. To accommodate users who operate portable communicators 70 primarily with their right hand, the drag-and-drop portion 302 may be placed on the touch screen to the left of the selection portion 304. Likewise, to accommodate users who operate portable communicators 70 primarily with their left hand, the drag-and-drop portion 302 may be placed on the touch screen to the right of the selection portion 304. However, the layout of the drag-and-drop portion 302 and the selection portion 304 may be configured in numerous other ways.

In some embodiments, the drag-and-drop portion 302 includes a list of input fields (e.g., a control parameter) 310, where each input field 310 includes the name and a value associated with the input field 310. The name of the input field and the value associated with that input field may be displayed in a single entry (e.g., a dialog box) on the display area of the touchscreen. For example, names and values associated with a given input field may be displayed in an entry in an offset form. Accordingly, minimal text clipping, abbreviations, horizontal scrolling, and so on, may occur. Furthermore, displaying names an values in an offset form may provide relatively seamless accommodation to changes in touchscreen resolution or orientation (e.g., changes in orientation from portrait to landscape and vice versa or changes between QVGA, VGA and WVGA displays).

In some embodiments, using the user interface 300, a user may scroll across the input fields 310 and corresponding select buttons 320 (or otherwise move the input fields 310 and corresponding select buttons 320) by pressing down, e.g., with a finger (or a stylus, or the back of a screwdriver), anywhere on the drag-and-drop portion 302 of the user interface 300 and moving the finger, for example, up or down, on the drag-and-drop portion 302 of the touchscreen. In some embodiments, where the portable communicator 70 is equipped with a D-pad, the user may use the D-pad to scroll across the input fields 310 and the corresponding buttons 320.

In some embodiments, the selection portion 302 includes a list of, for example, select buttons 320 (or other logical or virtual controls) that correspond to the input fields 310. Each select button 320 is configured to allow the user to select a value for the associated input field 310. In some embodiments, a user may select the value associated with an input field 310 by pressing down, e.g., with a finger, on the associated select button 320 and selecting a desired value from a list of values. For example, when a user presses down on a given select button 320, the user may be presented with a menu of possible values for the associated input field 310. The menu presented to the user may be in the form of a pop-up menu, a drop-down many, a collection of checkboxes or radio buttons, and so on. The user may select a desired value for the input field by pressing down on that value in the menu.

In some embodiments, the user interface 300 may be configured to block a user (e.g., a particular user or a group of users) from selecting values for given input fields 310b-310d. For example, it may be desired to provide a given user a relatively limited ability to reconfigure a certain input field for security purposes and/or to minimize human errors and reduce set-up time. A user may be alerted about a blocked input field in a number of ways. For example, a visual indicator 350b-350d may be placed next to the select buttons 320b-320d associated with blocked input fields 310b-310d.

In some embodiments, because the user interface 300 is configured so that the touchscreen is divided into several portions to include at least one drag-and-drop portion 302 and at lest one selection portion 304, the user interface 300 is configured to effectively separate the scrolling operations from the selecting operations. For example, the user may be prevented from scrolling across the input fields 320 and selecting values for the input fields 320 at the same time. As a result, adverse effects of skipping and jitter may be substantially minimized. More specifically, if skipping and/or jitter occurs during a scrolling operation, the scrolling and/or jitter may have little of no effect on preceding and/or subsequent selecting operations. Consequently, inadvertent selection of values for input fields may be prevented. Likewise, inadvertent selection scrolling may be prevented during the selection of values for input fields.

Referring to FIG. 4, a software system 400 for performing configuration, control and/or test functions on a field device may be compatible with a number of hardware platforms. For example, the software system 400 may execute on an embedded or standard (non-embedded) device. Further, the software system 400 may be compatible with standard operating systems such as Windows or Linux, for example, and/or with mobile operating systems such as Symbian OS, Android, etc. In one embodiment, the software system 500 is a Java application executable on a Java Virtual Machine (JVM). In one particular embodiment, the software system 500 executes on the portable communicator 70a or 70b.

As illustrated in FIG. 4, the software system 400 may include a communication interface module 402 for exchanging data over a wired or wireless communication link. In particular, the interface module 402 may include one or several drivers for supporting such communication standards as Bluetooth, for example. Additionally, the communication interface module 402 may include one or several drivers for supporting protocols specific to the process control industry (e.g., HART, Foundation® Fieldbus, Profibus, etc.)

A test logic module 404 and a control logic module 406 may include test and command functionality, respectively. The test logic module 404 may implement one or several routines for driving a valve to a certain setpoint (i.e., stroking the valve), obtaining time, pressure, position, etc. measurements from the valve via the module 402, and comparing the results to a predefined target or threshold. If desired, the test logic module 404 may also support trending and historical analysis functionality. The user may select a desired test routine via the user interface (e.g., interface 300), activate the test using a physical or logical control, and the test logic module 404 may exchange a series of commands and responses with the target field device as part of the selected test routine. In general, it will be appreciated that the test logic module 404 may support any desired test functionality for a valve or any other field device.

Similarly, the control logic module 406 may support control functions for any field device including a digital valve controller, for example. In some embodiments, the control logic module 406 may store a set of predefined setpoints which a user may select to perform a desired control function. For example, the user may wish to visually observe the operation of a particular valve when the valve travels from an open position to a 25% closed position. To this end, the control logic module 506 may support a command for stroking the valve to the 25% closed position which the user may easily select via the user interface, preferably by performing only few keystrokes or touch-screen selections. In some embodiments, the control logic module 506 may support configuration functions so that the user may, for example, download a desired configuration to a field device using the software system 500.

Further, the user interface module 408 may support an intuitive and efficient user interface such as described above with reference to FIG. 3, for example. In addition to physical (i.e., buttons, keys, etc.) and logical (i.e., scrollbars, virtual on-screen buttons, etc.) controls, it is contemplated that the user interface module 408 may receive commands via audio commands or any other suitable means including those known in the art.

In general, it will be noted that the software system 400 may include only some of the modules 402, 404, 406, and 408 described above. Moreover, it will be appreciated that some of these modules may be combined or distributed further, if desired. In one such embodiment, for example, the software system 400 may include only the test logic module 404 and a user interface module 408, and an independent software or firmware module may provide a wired or wireless communication interface to the system 500.

From the foregoing, it will be appreciated that the wired and/or wireless portable communicator 70 allows users to physically approach a field device such as a valve and perform device configuration and/or testing while visually and aurally observing the operation of the field device. To take one example, an operator may know, from his or her experience, that a certain screeching sound during operation of a valve typically indicates an abnormality. Because data collected remotely may not always reflect this abnormality, or because the operator can reliably interpret these and other "non-technical" clues, the operator may prefer to perform the test locally while observing the valve. Using the portable communicator 70, the operator may quickly and efficiently trigger a test from a location physically proximate to the field device.

In another respect, the operator may install the software system 400 on a smartphone which the operator typically carries in his or her pocket. In this manner, the operator need not carry a more bulky device such as a laptop when walking or driving from one part of the plant to another part of the plant. On the other hand, because the software system 500 (in at least some embodiments) is compatible with a standard operating system, the operator need not purchase a specialized instrument for communicating with field device. In yet another respect, wireless embodiments of the portable communicator 70 and wireless applications of the software system 400 allow the operator to access field devices more easily and therefore enjoy greater flexibility as well as safety. It is known, for example, that operators are sometimes forced to climb high ladders to access a wire contact.

FIG. 5 illustrates an example method 500 for interacting with a field device using the portable communicator described above. As explained above, an interface may be provided on the touchscreen of the portable communicator that includes a scrolling (e.g., drag-and-drop) portion and a separate selection portion. The scrolling portion may include multiple input fields that are associated with multiple parameters of the field device, and the scrolling portion may enables the user to scroll through the multiple input fields. The selection portion may enable the user to select values for the input fields (block 502). The may select values for the input fields via the user interface, and the user selection of the values may be received at the portable communicator (block 504). Once the user selection is received, the portable communicator may initiating a communication with the field device and configure and/or measure the parameters of the field device associated with the input fields based on the received user selection (block 506).

While the portable communicator has been described with reference to specific examples, which are intended to be illustrative only and not to be limiting of the disclosure, it will be apparent to those of ordinary skill in the art that changes, additions and/or deletions may be made to the disclosed embodiments without departing from the spirit and scope of the disclosure. It is intended that the specification and examples be considered as exemplary only, with a true scope and spirit of the disclosure being indicated by the following claims.

The invention claimed is:

1. A portable communicator for use in a process control system, the process control system including a controller coupled to a field device, the controller configured to communicate with the field device to control a physical process parameter or to measure a physical process control parameter in a process plant, the portable communicator comprising: a processor; a computer-readable memory having computer-readable instructions executable on the processor; a touchscreen including a grab-and-drag portion and a selection portion; and a software application stored on the computer readable memory and configured to execute on the processor to provide a user interface on the touchscreen, the user interface comprising: the grab-and-drag portion including a plurality of input fields, wherein the plurality of input fields are scrollable via a grab-and-drag mechanism; and the selection portion including at least one value associated with a corresponding input field of the plurality of input fields and simultaneously displayed with the grab-and-drag portion, wherein the selection portion is separate from the grab-and-drag portion and not scrollable via the selection portion, the selection portion configured to receive from a user a selection of a particular value for a particular input field of the plurality of input fields in the grab-and-drag portion, and wherein a scrolling operation associated with the grab-and-drag portion is separate from a selecting operation associated with the selection portion such that the user is prevented from scrolling and selecting values at the same time.

2. The portable communicator of claim 1, wherein the selection portion comprises a plurality of selection elements corresponding to the plurality of input fields.

3. The portable communicator of claim 2, wherein one of the plurality of selection elements is a non-blocked selection element, the non-blocked selection element configured to receive from the user a value for a corresponding input field.

4. The portable communicator of claim 3, wherein the non-blocked selection element is configured to provide the user with a plurality of possible values for the corresponding input field when the user selects the non-blocked selection element, and wherein the non-blocked selection element is configured to receive from the user a selection of one of the plurality of possible values for the corresponding input field.

5. The portable communicator of claim 2, wherein one of the plurality of selection elements is a blocked selection element, the blocked selection element configured to block the user from selecting a value for a corresponding input field.

6. The portable communicator of claim 5, wherein the blocked selection element includes a visual indicator alerting the user that the blocked selection element is configured to block the user from selecting the value for the corresponding input field.

7. The portable communicator of claim 1, wherein the grab-and-drag portion is adjacent to the selection portion.

8. The portable communicator of claim 7, wherein the grab-and-drag portion is horizontally adjacent to the selection portion.

9. The portable communicator of claim 1, wherein each of the plurality of input fields includes a name and a value associated with the respective input field, and wherein the name and the value associated with a given input field is displayed on the user interface in an offset form.

10. A portable communicator for use in a process control system, the process control system including a controller coupled to a field device, the controller configured to communicate with the field device to control a physical process parameter or to measure a physical process control parameter in a process plant, the portable communicator comprising: a processor; a computer-readable memory having computer-readable instructions executable on the processor; a touchscreen including a first portion and a second portion; and a software application stored on the computer readable memory and configured to execute on the processor to provide a user interface on the touchscreen, the user interface comprising: the first portion including a plurality of input fields, wherein the plurality of input fields are scrollable via a grab-and-drag mechanism; and the second portion including at least one value associated with a corresponding input field of the plurality of input fields and simultaneously displayed with the first portion, wherein the second portion is separate from the first portion and not scrollable via the second portion, the second portion configured to receive from a user a selection of a particular value for a particular input field of the plurality of input fields in the first portion, and wherein a scrolling operation associated with the first portion is separate from a selecting operation associated with the second portion such that the user is prevented from scrolling and selecting values at the same time.

11. The portable communicator of claim 10, wherein the second portion comprises a plurality of selection elements corresponding to the plurality of input fields.

12. The portable communicator of claim 11, wherein one of the plurality of selection elements is a non-blocked selection element configured to enable a user to select a value for a corresponding input field.

13. The portable communicator of claim 12, wherein the non-blocked selection element is configured to provide the user with a plurality of possible values for the corresponding input field when the user selects the non-blocked selection element, and wherein the non-blocked selection element is configured to receive from a user a selection one of the plurality of possible values for the corresponding input field.

14. The portable communicator of claim 10, wherein the plurality of input fields is scrollable via a grab-and-drag mechanism.

15. A method of interacting with an entity in a process control system, the process control system including a controller coupled to a field device, the controller configured to communicate with the field device to control a physical process parameter or to measure a physical process control parameter in a process plant, the method comprising: providing a user interface on a touchscreen of a portable communicator, the touchscreen having a first portion and a second portion, and the portable communicator having a processor and a computer-readable memory including computer-readable instructions executable on the processor to provide the user interface, the user interface comprising: the first portion including a plurality of input fields, wherein the plurality of input fields are scrollable via a grab-and-drag mechanism; and the second portion including at least one value associated with a corresponding input field of the plurality of input fields and simultaneously displayed with the first portion, wherein the second portion is separate from the first portion and not scrollable via the second portion, the second portion configured to receive from the user a selection of a particular value for a particular input field of the plurality of input fields in the first portion, and wherein a scrolling operation associated with the first portion is separate from a selecting operation associated with the second portion such that the user is prevented from scrolling and selecting values at the same time; receiving via the user interface the selection of the particular value for the particular input field of the plurality of input fields; and initiating a communication with the field device via the portable communicator to control a physical process parameter or measure a physical process control parameter in a process plant associated with the particular input field of the plurality of input fields based on the received selection of the particular value.

16. The method of claim 15, wherein the portable communicator is a generic mobile communication device selected from a group comprising a smartphone, a personal digital assistant (PDA), and a pocket personal computer (PC).

17. The method of claim 15, wherein the plurality of input fields is scrollable via a grab-and-drag mechanism.

18. The method of claim 15, further comprising blocking the user from selecting a value for a blocked one of the plurality of input fields.

19. The method of claim 18, further comprising indicating to the user, via a visual indication, which of the plurality of input fields is the blocked one of the plurality of input fields.

20. The method of claim 15, wherein initiating the communication with the field device comprises initiating the communication with the field device in a wireless manner and without communicating the controller.

21. A process control system comprising: a field device; a controller coupled to the field device, the controller configured to communicate with the field device to control a physical process parameter or to measure a physical process control parameter in a process plant; and a portable communicator coupled to the field device, the portable communicator comprising: a processor; a computer-readable memory having computer-readable instructions executable on the processor; a touchscreen including a first portion and a second portion; and a software application stored on the computer readable memory and configured to execute on the processor to provide a user interface on the touchscreen, the user interface comprising: the first portion including a plurality of input fields, wherein the plurality of input fields are scrollable via a grab-and-drag mechanism; and the second portion including at least one value associated with a corresponding input field of the plurality of input fields and simultaneously displayed with the first portion, wherein the second portion is separate from the first portion and not scrollable via the second portion, the second portion configured to receive from a user a selection of a particular value for a particular input field of the plurality of input fields in the first portion, and wherein a scrolling operation associated with the first portion is separate from a selecting operation associated with the second portion such that the user is prevented from scrolling and selecting values at the same time.

* * * * *